United States Patent
Zechlin et al.

(10) Patent No.: US 12,441,680 B2
(45) Date of Patent: Oct. 14, 2025

(54) METHOD FOR PRODUCING ISOCYANATES

(71) Applicants: Covestro Deutschland AG, Leverkusen (DE); Covestro Intellectual Property GmbH & Co. KG, Leverkusen (DE)

(72) Inventors: Joachim Zechlin, Neuss (DE); Tim Loddenkemper, Dormagen (DE); Thomas Bludowsky, Ratingen (DE)

(73) Assignee: Covestro Deutschland AG, Leverkusen (DE)

(*) Notice: Subject to any disclaimer, the term of this patent is extended or adjusted under 35 U.S.C. 154(b) by 877 days.

(21) Appl. No.: 17/640,419

(22) PCT Filed: Sep. 14, 2020

(86) PCT No.: PCT/EP2020/075591
§ 371 (c)(1),
(2) Date: Mar. 4, 2022

(87) PCT Pub. No.: WO2021/052894
PCT Pub. Date: Mar. 25, 2021

(65) Prior Publication Data
US 2022/0332677 A1  Oct. 20, 2022

(30) Foreign Application Priority Data

Sep. 17, 2019 (EP) .................. 19197784
Feb. 5, 2020 (EP) .................. 20155540
May 26, 2020 (EP) .................. 20176532

(51) Int. Cl.
C07C 263/10 (2006.01)
C07C 263/20 (2006.01)

(52) U.S. Cl.
CPC .......... *C07C 263/10* (2013.01); *C07C 263/20* (2013.01)

(58) Field of Classification Search
CPC .................. C07C 263/10; C07C 263/20
See application file for complete search history.

(56) References Cited

U.S. PATENT DOCUMENTS

| | | | |
|---|---|---|---|
| 3,713,833 A | 1/1973 | Lindholm et al. |
| 4,289,732 A | 9/1981 | Bauer et al. |
| 4,419,295 A | 12/1983 | Hennig et al. |
| 4,847,408 A | 7/1989 | Anonymus et al. |
| 4,851,570 A | 7/1989 | Zaby et al. |
| 4,851,571 A | 7/1989 | Sauer et al. |
| 4,915,509 A | 4/1990 | Sauer et al. |
| 5,117,048 A | 5/1992 | Zaby et al. |
| 5,449,818 A | 9/1995 | Biskup et al. |
| 5,931,579 A | 8/1999 | Gallus et al. |
| 6,800,781 B2 | 10/2004 | Herold et al. |
| 6,803,482 B2 | 10/2004 | Jenne et al. |
| 6,930,199 B2 | 8/2005 | Meyn et al. |
| 6,974,880 B2 | 12/2005 | Biskup et al. |
| 7,019,164 B2 | 3/2006 | Friedrich et al. |
| 7,108,770 B2 | 9/2006 | Grün et al. |
| 7,118,653 B2 | 10/2006 | Brady et al. |
| 7,202,378 B2 | 4/2007 | Zechlin et al. |
| 7,524,405 B2 | 4/2009 | Sohn et al. |
| 7,615,662 B2 | 11/2009 | Pohl et al. |
| 7,754,915 B2 | 7/2010 | Herold et al. |
| 8,546,606 B2 | 10/2013 | Brodhagen et al. |
| 8,692,016 B2 | 4/2014 | Sanders et al. |
| 8,759,569 B2 | 6/2014 | Schelling et al. |
| 10,577,311 B2 | 3/2020 | Knauf et al. |
| 10,703,713 B2 | 7/2020 | Loddenkemper et al. |
| 10,947,187 B2 | 3/2021 | Knauf et al. |
| 10,975,021 B2 | 4/2021 | Hyeon et al. |
| 2003/0230476 A1 | 12/2003 | Brady et al. |
| 2006/0089507 A1 | 4/2006 | Sohn et al. |
| 2006/0135810 A1 | 6/2006 | Wolfert et al. |
| 2007/0015934 A1 | 1/2007 | Wolfert et al. |
| 2007/0265465 A1 | 11/2007 | Keggenhoff et al. |
| 2007/0299279 A1 | 12/2007 | Pohl et al. |
| 2010/0160673 A1 | 6/2010 | Bruns et al. |
| 2010/0298596 A1 | 11/2010 | Keggenhoff et al. |
| 2020/0339505 A1 | 10/2020 | Merkel et al. |

FOREIGN PATENT DOCUMENTS

| | | | |
|---|---|---|---|
| GB | 1238669 A | | 7/1971 |
| JP | 2006510696 | * | 3/2006 |
| WO | WO-2019145380 A1 | * | 8/2019 ........... C07C 263/10 |

OTHER PUBLICATIONS

Chem System's PERP Report for TDI/MDI (Chem Systems, Process Evaluation Research Planning TDI/MDI 98/99 S8, Tarrytown, N.Y., USA: Chem Systems 1999, p. 27 to 32).
International Search Report, PCT/EP2020/075591, date of mailing: Nov. 13, 2020, Authorized officer: Wolfgang Fitz.

* cited by examiner

*Primary Examiner* — Deborah D Carr
(74) *Attorney, Agent, or Firm* — Donald R. Palladino

(57) ABSTRACT

The present invention relates to a process for preparing an isocyanate comprising the steps of (A) reacting an amine with a stoichiometric excess of phosgene using an aromatic solvent of formula $C_6H_{6-X}Cl_X$, wherein X=1 or 2, (a) as a diluent during the reaction and/or (b) as a means for cooling the reaction mixture formed from the reaction of the amine with phosgene (so-called quench) to obtain (optionally after a decompression) a liquid product mixture comprising the isocyanate and the aromatic solvent employed and a gaseous product mixture containing phosgene and hydrogen chloride; followed by (B) isolating the isocyanate from the liquid product mixture obtained in step (A) comprising the step of a final distillation in which the isolated isocyanate is obtained as a product stream, wherein in the final distillation or in a distillation step upstream of the final distillation at least one stream comprising aromatic solvent of formula $C_6H_{6-Y}Cl_Y$, wherein Y=X+1, is (at intervals or continuously) discharged such that the isolated isocyanate has a mass fraction, based on its total mass, of aromatic solvent of formula $C_6H_{6-Y}Cl_Y$ in the range from 0.0 ppm to 9.9 ppm, preferably 0.0 ppm to 5.0 ppm, particularly preferably 0.0 ppm to 3.0 ppm.

12 Claims, No Drawings

METHOD FOR PRODUCING ISOCYANATES

CROSS-REFERENCE TO RELATED APPLICATION

This application is a national stage application under 35 U.S.C. § 371 of PCT/EP2020/075591, filed Sep. 14, 2020, which claims the benefit of European Application No. 19197784.2, filed Sep. 17, 2019, European Application No. 20155540.6, filed Feb. 5, 2020, and European Application No. 20176532.8, filed May 26, 2020, each of which is incorporated herein by reference.

FIELD

The present invention relates to a process for preparing an isocyanate comprising the steps (A): reacting an amine with a stoichiometric excess of phosgene using an aromatic solvent of formula $C_6H_{6-X}Cl_X$, wherein X=1 or 2, (a) as a diluent during the reaction and/or (b) as a means for cooling the reaction mixture formed from the reaction of the amine with phosgene (so-called quench) to obtain (optionally after a decompression) a liquid product mixture comprising the isocyanate and the aromatic solvent employed and a gaseous product mixture containing phosgene and hydrogen chloride; followed by (B): isolating the isocyanate from the liquid product mixture obtained in step (A) comprising the step of a final distillation in which the isolated isocyanate is obtained as a product stream, wherein at least one stream comprising aromatic solvent of formula $C_6H_{6-Y}Cl_Y$, wherein Y=X+1, is (at intervals or continuously) discharged in the final distillation or in a distillation step upstream of the final distillation, such that the isolated isocyanate has a mass fraction, based on its total mass, of aromatic solvent of formula $C_6H_{6-Y}Cl_Y$ in the range from 0.0 ppm to 9.9 ppm, preferably 0.0 ppm to 5.0 ppm, particularly preferably 0.0 ppm to 3.0 ppm.

BACKGROUND

Isocyanates are prepared in large volumes and serve mainly as starting materials for the production of polyurethanes. They are usually prepared by reacting the corresponding amines with phosgene, using phosgene in a stoichiometric excess. The reaction of the amines with phosgene can be effected either in the gas phase or in the liquid phase, wherein the reaction can be conducted batchwise or continuously. Processes for preparing organic isocyanates from primary amines and phosgene have have already been described numerous times. Of interest on the large industrial scale are not only aromatic isocyanates, for example the diamines of the diphenylmethane series (henceforth MMDI- "monomeric MDI"), mixtures of MMDI and the polyamines of the diphenylmethane series (i.e. the higher homologs of MMDI, henceforth PMDI, "polymeric MDI"; mixtures of MMDI and PMDI are henceforth summarized as MDI) or tolylene diisocyanate (TDI), but also aliphatic or cycloaliphatic isocyanates, for example pentane 1,5-diisocyanate (PDI), hexamethylene 1,6-diisocyanate (HDI) and isophorone diisocyanate (IPDI). Isocyanates having benzylic isocyanate groups (aliphatic isocyanates) are also important, in particular xylylene diisocyanate (XDI).

The modern industrial scale preparation of isocyanates is effected semicontinuously (batchwise performance of some of the preparation steps, for example batchwise reaction and continuous workup) or continuously (all steps continuous).

It is a feature of the process regime in the liquid phase, typically referred to as liquid phase phosgenation, that the reaction conditions are chosen such that at least the amine, crude isocyanate and phosgene reaction components, but preferably all the reactants, products and reaction intermediates, are in liquid form in a suitable solvent under the conditions chosen. On completion of conversion, a gas phase comprising the hydrogen chloride coproduct and unconverted phosgene (because it was used in a superstoichiometric amount) is separated. This leaves the desired isocyanate, together with the solvent, mostly in the liquid phase. The crude isocyanate is thus obtained in a mixture with solvent as a liquid stream which is worked up to obtain pure isocyanate (and to recover solvent and dissolved fractions of phosgene and hydrogen chloride).

It is a feature of the process regime in the gas phase, typically referred to as gas phase phosgenation, that the reaction conditions are chosen such that at least the amine, isocyanate and phosgene reaction components, but preferably all the reactants, products and reaction intermediates, are gaseous under the conditions chosen. Advantages of gas phase phosgenation are inter alia reduced phosgene "holdup", the avoidance of intermediates that are difficult to phosgenate, increased reaction yields and lower energy requirements since less solvent is being employed. The reaction mixture initially obtained in gaseous form in the gas phase phosgenation is cooled in a so-called quench by contacting with a quench liquid composed of solvent or an isocyanate-solvent mixture in such a way that the desired isocyanate is largely liquefied and a hydrogen chloride- and phosgene-containing gas phase remains.

All isocyanate preparation processes of relevance on the industrial scale therefore produce a liquid crude isocyanate stream which has to be worked up to obtain the desired isocyanate in pure form and to recover other value materials such as solvent. This workup generally comprises the removal of solvent, dissolved phosgene and dissolved hydrogen chloride. This is followed by a final purification of the isocyanate which, if required, may also comprise an isomer separation. Depending on the type of isocyanate, it is possible to conduct a separation of homologs prior to the final purification. Particular mention should be made here of the partial separation of MMDI from the isocyanate mixture comprising MMDI and PMDI that has been very substantially freed of solvent, phosgene and hydrogen chloride to obtain an MMDI fraction containing insignificant traces at most of PMDI (crude MMDI), and a mixture of PMDI and MMDI.

The workup of a crude isocyanate stream on the industrial scale is not trivial because many different requirements have to be taken into account at the same time. As well as obtaining the target product in a form of maximum purity, the recovery of phosgene, hydrogen chloride and solvent with minimum loss should also be mentioned here, especially for the purpose of recycling these into the process (optionally after further conversion, for instance of hydrogen chloride to chlorine). All this has to be effected under conditions of maximum economic viability, i.e. with minimum energy consumption and minimum loss of product of value (especially of isocyanate, which can undergo undesired further reactions in the case of nonoptimized workup). It goes without saying that the desired isocyanate must be freed of byproducts, the aromatic solvent employed, excess phosgene and the like as completely as possible. Since chlorinated aromatic hydrocarbons (in particular mono- or dichlorobenzene) have proven advantageous as solvents for isocyanate production, it should be mentioned in this context that the requirements for pure isocyanates are becoming increasingly stringent as regards the residual content of such chlorinated aromatic solvents, thereby also increasing the challenges to distillation technology. These increased requirements are being introduced on the grounds that the polyurethane products produced from the isocyanates should not produce any hazardous emissions, this being particularly important in the case of foams for seat cushions or mattresses. In addition to the aromatic solvents actually employed, the prior art focuses on their fully chlorinated reaction products (i.e. hexachlorobenzene if mono- or dichlorobenzene are used as solvent). Solvents with a higher chlorine content than the aromatic solvent employed are formed by chlorination of the aromatic solvent employed in the phosgenation and/or in the workup of the crude isocyanate. Reaction products of the aromatic solvent employed containing only one additional chlorine substituent have, to the knowledge of the applicant, not hitherto received any particular attention in the prior art.

The workup of crude isocyanates has already been described numerous times:

International patent application WO 2017/050776 A1 describes the workup of a liquid solvent-containing crude isocyanate stream obtained by liquid phase phosgenation by separation of phosgene and hydrogen chloride ("dephosgenation"), followed by separation of the solvent. This is followed by a further purification by distillation of the crude isocyanate (that has already been largely freed of phosgene, hydrogen chloride and solvent). In the case of MDI, this distillation also includes a separation of homologs, in which MMDI is separated off, while a PMDI/MMDI mixture depleted in MMDI remains (so-called "polymer separation").

Options for workup including homolog and isomer separation from MDI are described in detail in WO 2019/134909 A1. Options for workup of a crude TDI are described in WO 2018/114846 A1 both for liquid phase and gas phase phosgenation.

International patent application WO 2019/145380 A1 describes the preparation and workup of aliphatic, cycloaliphatic and araliphatic isocyanates in the gas phase followed by rapid partial liquefaction ("quenching") of the resulting product gas mixture with a quenching liquid containing an aromatic solvent. This affords not only a liquid product stream comprising the desired isocyanate but also a gas stream comprising hydrogen chloride and phosgene. The isocyanate is isolated from the liquid product stream through a plurality of distillation steps. Excess phosgene is recovered as a phosgene gas stream and recycled into the reaction. The document teaches limiting the content of benzene, chlorobenzene and dichlorobenzene in this recovered phosgene gas stream to a value of 0.5% by weight or less. This reduces the hexachlorobenzene content in the isocyanate to be prepared (see examples in the application). This document is based on the finding that small amounts of benzene, chlorobenzene or dichlorobenzene in the gas stream introduced into the reaction zone result in formation of polychlorinated aromatics, especially in formation of the problematic hexachlorobenzene. It will be appreciated that the term polychlorinated aromatics is to be understood as meaning reaction products that are formed by polychlorination of benzene, chlorobenzene and dichlorobenzene, namely in the reaction zone (cf. page 3, last paragraph).

According to the teaching of this document the recovery of excess phosgene is carried out such that initially the gas mixture of hydrogen chloride and phosgene generated in the reaction is separated into a gaseous hydrogen chloride stream and a liquid phosgene stream. The liquid phosgene stream is then partially evaporated, which is preferably carried out in a distillation column. The top of this distillation column may be provided with an feeding point for liquid fresh phosgene. The content of benzene, chlorobenzene and dichlorobenzene in the gaseous phosgene stream withdrawn from the distillation column can be reduced to the value of 0.5% by weight or less specified according to the invention through suitable choice of the exit temperature of this gaseous phosgene stream and optionally through suitable choice of the amount of fresh phosgene additionally applied to the distillation column. This document does not specify any further measures for achieving this value.

In particular, the reference does not teach that a stream of aromatic solvent from the final distillation of the isocyanate or a distillation step upstream of the final distillation step which has been additionally monochlorinated in the reaction be discharged from the entire process. WO 2019/145380 A1 gives no indication that reactions other than complete chlorination reactions even occur, nor does this document give any indication that chlorination reactions (of any kind) can be important in the context of the workup (see page 4, first paragraph).

European patent application EP 1 717 223 A2 describes (see paragraph [0015]) a process for purifying isocyanates comprising a) separating a stream (1) containing isocyanate, higher-boiling and lower-boiling components and non-evaporable residue in a distillation containing at least one theoretical plate into a substream (2) containing an non-evaporable residue and isocyanate and into a vapor stream (3) containing isocyanate and low boilers, b) keeping the non-evaporable residue in substream (2) separate from the vapor stream (3) and/or from material streams which at least partially contain the vapor stream (3), c) separating from the substream (2) at least one further isocyanate-containing vapor stream (4) and a stream (8) containing substantially non-evaporable residue and d) distillatively separating the isocyanate-containing vapor stream(s) (4) and the vapor stream (3) from a) into three individual streams (5, 6, 7) having different boiling ranges, wherein the lowest-boiling stream (5) contains a substantial portion of the low boiler proportion of the crude isocyanate stream (1), the highest-boiling stream (7) contains a substantial portion of the high boiler proportion of the crude isocyanate stream (1) and the medium-boiling stream (6) substantially contains desired product.

Stream (1), the crude isocyanate stream to be purified, is, when preparing the isocyanate—as is preferred—by phosgenation, a stream from which hydrogen chloride, phosgene and solvent have been substantially separated. As a consequence, the content of hydrogen chloride and phosgene in stream (1) is in each case below 1000 ppm and the solvent content is below 1% by weight, preferably below 0.5% by weight and particularly preferably below 0.1% by weight. The crude isocyanate stream not only contains the isocyanate to be obtained as the desired product, but also contains typically 100 ppm to 5% of components that have a lower boiling point than the isocyanate (low boilers), 100 to 5000 ppm of components that have a higher boiling point than the isocyanate (high boilers)—the boiling point of which is, however, not more than 60° C. higher than the boiling point of the isocyanate at standard pressure—and contains 1% to 8% by weight of an non-evaporable residue of polymeric nature, i.e. the product pyrolyzes before it evaporates at standard pressure. The solvent—which has a low boiling point compared to the isocyanate—is thus present in the crude isocyanate stream (1) at most in traces and in this context the term low boilers is thus evidently to be understood as meaning other components. Specifically mentioned are, inter alia, chlorine-containing byproducts resulting from further reaction of the isocyanate (and not the solvent) (for example the two chlorine-containing secondary components 1-isocyanato-6-chlorohexane or 1,6-dichlorohexane if 1,6-diisocyanatohexane is being prepared). The document makes no mention of either partial or complete chlorination of solvents. Typical low boilers in the case of aromatic isocyanates are methylphenyl isocyanate (production of TDI) and phenyl isocyanate (production of MDI).

In a preferred embodiment of the described process which is shown in FIG. 2, the crude isocyanate stream (1) is fed laterally into a dividing wall column and therein separated into the three streams 5, 6 and 7, wherein the lowest-boiling stream (5) is withdrawn above the dividing wall at the top of the column, the medium-boiling stream (6) (=the stream of desired product) is withdrawn in the region of the dividing wall above the feed and the highest-boiling stream (7) is withdrawn in the bottom of the column. The example recites typical compositions of these streams for the case of preparation of TDI:

The lowest-boiling stream (5) contains (in addition to considerable proportions of isocyanate, namely 99.4% by weight of TDI) 0.5% by weight of low boilers; the makeup of the remaining 0.1% by weight is not specified (see upper table on page 7). The medium-boiling stream (6) contains 99.9% by weight TDI, 10 ppm of low boilers and 50 ppm of higher-boiling components. The makeup of the remaining 0.094% by weight (940 ppm) of the medium-boiling stream (6) is not specified. The highest-boiling stream (7) consists of 30% by weight TDI and 70% by weight of higher-boiling components.

In connection with the objective of obtaining isocyanates having the lowest possible residual proportion of solvent to avoid hazardous emissions in downstream polyurethane products, it has now been found that further factors are important. There was therefore a need for further improvements in this field.

SUMMARY

Taking into account this need the present invention therefore provides a process for preparing an isocyanate comprising the steps of:
(A) reacting an (aromatic, aliphatic, cycloaliphatic or araliphatic, preferably aromatic) amine with a stoichiometric excess of phosgene using an aromatic solvent of formula $C_6H_{6-X}Cl_X$, wherein X=1 or 2,
  (a) as a diluent during the reaction and/or
  (b) as a means for cooling the reaction mixture formed from the reaction of the amine with phosgene (so-called quench) to obtain (optionally after a decompression) a liquid product mixture comprising the isocyanate and the aromatic solvent employed and a gaseous product mixture containing phosgene and hydrogen chloride;
(B) isolating the isocyanate from the liquid product mixture obtained in step (A) comprising the step of a final distillation in which the isolated isocyanate is obtained as a product stream, wherein in the final distillation or in a distillation step upstream of the final distillation at least one stream comprising aromatic solvent of formula $C_6H_{6-Y}Cl_Y$, wherein Y=X+1, is (at intervals or continuously) discharged (i.e. sent out of the process for preparing the isocyanate) such that the isolated isocyanate has a mass fraction, based on its total mass, of aromatic solvent of formula $C_6H_{6-Y}Cl_Y$ in the range from 0.0 ppm to 9.9 ppm, preferably 0.0 ppm to 5.0 ppm, particularly preferably 0.0 ppm to 3.0 ppm.

It has, in fact, been found that not only the aromatic solvent employed ($C_6H_{6-X}Cl_X$), but also its reaction products having only one additional chlorine substituent (one additional chlorine-containing aromatic solvent $C_6H_{6-Y}Cl_Y$) require sufficient separation from the isocyanate target product. As a result of the normally numerous solvent recycling circuits within a state-of-the-art isocyanate production process, this requires sending this one additional chlorine-containing aromatic solvent $C_6H_{6-Y}Cl_Y$ out of the process (=discharging). These one additional chlorine-containing solvents $C_6H_{6-Y}Cl_Y$ are, in fact, also of decisive importance in being able to provide polyurethane products without hazardous emissions. If in addition to limiting the content of aromatic solvent employed ($C_6H_{6-X}Cl_X$) in the isocyanate to be prepared (as is customary in the art), the content of one additional chlorine-containing aromatic solvent ($C_6H_{6-Y}Cl_Y$) is also limited, namely to 9.9 ppm or less as provided for according to the invention, it can be assumed that the total content of chloroaromatics (i.e. the employed solvent and all of its chlorination products) is sufficiently low.

The mass fraction of aromatic solvent of formula $C_6H_{6-Y}Cl_Y$ in the isolated isocyanate based on the total mass may in principle be determined by any methods familiar to those skilled in the art for determining the concentration of low molecular weight organic compounds. These generally provide results that are consistent in the context of the precision required for the purposes of the present invention. Preference is given to measurement by gas chromatography using a flame ionization detector (FID detector) or electron capture detector (ECD detector). In case of doubt, the value determined by gas chromatography using a flame ionization detector is decisive.

The term "discharging" and verbs and adjectives derived therefrom relate in the context of the present invention to sending a stream generated in the process (i.e. in the process for preparing an isocyanate) out of the process (i.e. out of the process for preparing the isocyanate); i.e. streams discharged in this way are not recycled back into the process, neither into the reaction part nor into the workup part. Discharged streams are preferably sent for disposal, in particular incinerated. However, material recovery of such discharged streams is not ruled out, except for their recycling into the process for preparing the isocyanate. Discharged streams contain aromatic solvent of formula $C_6H_{6-Y}Cl_Y$ especially in a mass fraction based on their total mass in the range from 1.0% to 10%, preferably in the range from 1.5% to 5.0%, particularly preferably in the range from 2.2% to 3.0%.

There now follows a brief summary of various possible embodiments of the invention.

In a first embodiment of the invention which may be combined with all other embodiments, the liquid product mixture obtained in step (A) is, in step (B), prior to the final distillation, passed through a dephosgenation for separating dissolved phosgene.

In a second embodiment of the invention which may be combined with all other embodiments, the gaseous product mixture obtained in step (A) is, in step (B), subjected to a scrubbing with aromatic solvent of formula $C_6H_{6-X}Cl_X$ for separating isocyanate.

In a third embodiment of the invention which may be combined with all other embodiments, the liquid product mixture obtained in step (A) is, in step (B), prior to the final distillation, subjected to a solvent distillation for separating aromatic solvent of formula $C_6H_{6-X}Cl_X$ (wherein the solvent distillation may comprise a further distillation for purifying the separated aromatic solvent of formula $C_6H_{6-X}Cl_X$).

In a fourth embodiment of the invention which is a particular configuration of the third embodiment, the aromatic solvent of formula $C_6H_{6-X}Cl_X$ separated in the solvent distillation is sent to a solvent purification for separating phosgene present therein (solvent dephosgenation).

In a fifth embodiment of the invention which may be combined with all other embodiments provided that these do not preclude the use of a dividing wall column in the final distillation, in step (B), the final distillation is performed in a dividing wall column to obtain the product stream of isocyanate in a sidestream takeoff from the dividing wall column and aromatic solvent of formula $C_6H_{6-X}Cl_X$ at the top of the dividing wall column (wherein the final distillation may comprise a further distillation column for purifying the aromatic solvent of formula $C_6H_{6-X}Cl_X$ obtained at the top of the dividing wall column).

In a sixth embodiment of the invention which may be combined with all other embodiments provided that these do not provide for the use of a dividing wall column in the final distillation, in step (B), the final distillation is performed in two serially arranged non-dividing wall distillation columns to obtain aromatic solvent of formula $C_6H_{6-X}Cl_X$ at the top of the first distillation column and the product stream of isocyanate as distillate from the second distillation column (wherein the final distillation may comprise a further distillation column for purifying the aromatic solvent of formula $C_6H_{6-X}Cl_X$ obtained at the top of the first distillation column).

In a seventh embodiment of the invention which may be combined with all other embodiments provided that these comprise a solvent distillation, the aromatic solvent of formula $C_6H_{6-X}Cl_X$ separated in the solvent distillation is obtained in a mixture with aromatic solvent of formula $C_6H_{6-Y}Cl_Y$ (=the mixture obtained in the solvent distillation), wherein a first portion of this mixture (optionally after solvent dephosgenation) is recycled into step (A) and a second portion of this mixture is not recycled into step (A) but is (at intervals or continuously) discharged.

In an eighth embodiment of the invention which is an alternative to the seventh and below-mentioned ninth embodiment but may otherwise be combined with all other embodiments provided these comprise a solvent distillation, the aromatic solvent of formula $C_6H_{6-X}Cl_X$ separated in the solvent distillation is obtained in a mixture with aromatic solvent of formula $C_6H_{6-Y}Cl_Y$ (=the mixture obtained in the solvent distillation), wherein a first portion of this mixture (optionally after solvent dephosgenation) is recycled into step (A) and a second portion of this mixture is purified in a further distillation, wherein aromatic solvent of formula $C_6H_{6-X}Cl_X$ is separated from the second portion of this mixture and subsequently (at least partially, especially completely) recycled into step (A), wherein the portion (enriched in aromatic solvent of formula $C_6H_{6-Y}Cl_Y$) of the second portion of this mixture remaining after the separation of the aromatic solvent of formula $C_6H_{6-X}Cl_X$ from the second portion of this mixture is (at intervals or continuously) discharged.

In a ninth embodiment of the invention which is an alternative to the seventh and eighth embodiment but may otherwise be combined with all other embodiments provided these comprise a solvent distillation, the aromatic solvent of formula $C_6H_{6-X}Cl_X$ separated in the solvent distillation is obtained in a mixture with aromatic solvent of formula $C_6H_{6-Y}Cl_Y$ (=the mixture obtained in the solvent distillation), wherein this mixture is purified in a further distillation, wherein aromatic solvent of formula $C_6H_{6-X}Cl_X$ is separated from this mixture and subsequently (at least partially, especially completely) recycled into step (A), wherein the portion (enriched in aromatic solvent of formula $C_6H_{6-Y}Cl_Y$) of this mixture remaining after the separation of the aromatic solvent of formula $C_6H_{6-X}Cl_X$ from this mixture is (at intervals or continuously) discharged.

In a tenth embodiment of the invention which is a particular configuration of the fifth/sixth embodiment, the aromatic solvent of formula $C_6H_{6-X}Cl_X$ obtained at the top of the dividing wall column or at the top of the first distillation column is obtained in a mixture with aromatic solvent of formula $C_6H_{6-Y}Cl_Y$ (=the mixture obtained at the top of the dividing wall column or at the top of the first distillation column).

In an eleventh embodiment of the invention which is a first particular configuration of the tenth embodiment, the resulting mixture (i.e. the mixture obtained at the top of the dividing wall column or at the top of the first distillation column) is discharged.

In a twelfth embodiment of the invention which is a second particular configuration of the tenth embodiment, a first portion of the mixture obtained at the top of the dividing wall column or at the top of the first distillation column is recycled into step (A) and a second portion of this mixture is not recycled into step (A) but is (at intervals or continuously) discharged.

In a thirteenth embodiment of the invention which is a third particular configuration of the tenth embodiment, namely for the case where step (B) comprises a step of scrubbing the gaseous product mixture obtained in step (A) with aromatic solvent of formula $C_6H_{6-X}Cl_X$ for separating isocyanate (=second above-mentioned embodiment), a first portion of the mixture obtained at the top of the dividing wall column or at the top of the first distillation column is recycled into the scrubbing step and a second portion of this mixture is not recycled into the scrubbing step but is (at intervals or continuously) discharged.

In a fourteenth embodiment of the invention which is a fourth particular configuration of the tenth embodiment, a first portion of the mixture obtained at the top of the dividing wall column or at the top of the first distillation column is recycled into step (A) and a second portion of this mixture is purified in a further distillation, wherein aromatic solvent of formula $C_6H_{6-X}Cl_X$ is separated from the second portion of this mixture and then (at least partially, especially completely) recycled into step (A), wherein the portion (enriched in aromatic solvent of formula $C_6H_{6-Y}Cl_Y$) of the second portion of this mixture remaining after the separation of the aromatic solvent of formula $C_6H_{6-X}Cl_X$ from the second portion of the mixture is (at intervals or continuously) discharged.

In a fifteenth embodiment of the invention which is a fifth particular configuration of the tenth embodiment, namely for the case where step (B) comprises a step of scrubbing the gaseous product mixture obtained in step (A) with aromatic solvent of formula $C_6H_{6-X}Cl_X$ for separating isocyanate (=second above-mentioned embodiment), a first portion of the mixture obtained at the top of the dividing wall column or at the top of the first distillation column is recycled into the scrubbing step and a second portion of this mixture is purified in a further distillation, wherein aromatic solvent of formula $C_6H_{6-X}Cl_X$ is separated from the second portion of this mixture and then (at least partially, especially completely) recycled into the scrubbing step or into step (A), wherein the portion (enriched in aromatic solvent of formula $C_6H_{6-Y}Cl_Y$) of the second portion of this mixture remaining after the separation of the aromatic solvent of formula $C_6H_{6-X}Cl_X$ from the second portion of this mixture is (at intervals or continuously) discharged.

In a sixteenth embodiment of the invention which is a sixth particular configuration of the tenth embodiment, the mixture obtained at the top of the dividing wall column or at the top of the first distillation column is purified in a further distillation, wherein aromatic solvent of formula $C_6H_{6-X}Cl_X$ is separated from this mixture and then (at least partially, especially completely) recycled into step (A), wherein the portion (enriched in aromatic solvent of formula $C_6H_{6-Y}Cl_Y$) of this mixture remaining after the separation of the aromatic solvent of formula $C_6H_{6-X}Cl_X$ from this mixture is (at intervals or continuously) discharged.

In a seventeenth embodiment of the invention which is a seventh particular configuration of the tenth embodiment namely for the case where step (B) comprises a step of scrubbing the gaseous product mixture obtained in step (A) with aromatic solvent of formula $C_6H_{6-X}Cl_X$ for separating isocyanate (=second above-mentioned embodiment), the mixture obtained at the top of the dividing wall column or at the top of the first distillation column is purified in a further distillation, wherein aromatic solvent of formula $C_6H_{6-X}Cl_X$ is separated from this mixture and (at least partially, especially completely) recycled into the scrubbing step or into step (A), wherein the portion (enriched in aromatic solvent of formula $C_6H_{6-Y}Cl_Y$) of this mixture remaining after the separation of the aromatic solvent of formula $C_6H_{6-X}Cl_X$ from this mixture is (at intervals or continuously) discharged.

In an eighteenth embodiment of the invention which may be combined with all other embodiments provided that these comprise a solvent distillation in which the aromatic solvent of formula $C_6H_{6-X}Cl_X$ separated in the solvent distillation is obtained in a mixture with aromatic solvent of formula $C_6H_{6-Y}Cl_Y$ (=the mixture obtained in the solvent distillation), wherein this mixture is partially or completely discharged, the discharged portion of this mixture/the discharged mixture is incinerated.

In a nineteenth embodiment of the invention which may be combined with all other embodiments, pipe conduits which are used for connecting a tank container for receiving the liquid product mixture from step (A) with distillation means for performing step (B) and/or for connecting these distillation means to one another are fabricated from stainless steel of type 2.4610, 1.4529 or 1.4539.

In a twentieth embodiment of the invention which is a particular configuration of the nineteenth embodiment, the step of the final distillation in which the product stream of isolated isocyanate is obtained is performed in a distillation column having a container for receiving liquid distillation bottoms fabricated from stainless steel of type 2.4610, 1.4529 or 1.4539.

In a twenty-first embodiment of the invention which may be combined with all other embodiments provided they do not relate to liquid phase phosgenations, the reaction of the amine with phosgene in step (A) is carried out in the gas phase, wherein (b) is comprised.

In a twenty-second embodiment of the invention which is a particular configuration of the twenty-first embodiment, the amine is selected from the group consisting of diamines of the diphenylmethane series (to obtain diisocyanates of the diphenylmethane series), tolylenediamine (to obtain tolylene diisocyanate), xylylenediamine (to obtain xylylene diisocyanate), bis(aminomethyl)cyclohexane (to obtain bis(isocyanatomethyl)cyclohexane), bis(aminomethyl)norbornane (to obtain bis(isocyanatomethyl)norbornane), hexahydrotolylenediamine (to obtain hexahydrotolylene diisocyanate), 1,6-hexamethylenediamine (to obtain hexamethylene diisocyanate), 1,5-pentamethylendiamine (to obtain pentamethylene diisocyanate) and isophoronediamine (to obtain isophorone diisocyanate).

In a twenty-third embodiment of the invention which may be combined with all other embodiments provided these do not relate to gas phase phosgenations, the reaction of the amine with phosgene in step (A) is carried out in the liquid phase, wherein (a) is comprised.

In a twenty-fourth embodiment of the invention which is a particular configuration of the twenty-third embodiment, the amine is selected from the group consisting of di- and polyamines of the diphenylmethane series (to obtain di- and polyisocyanates of the diphenylmethane series), naphthalenediamine (to obtain naphthalene diisocyanate), tolylenediamine (to obtain tolylene diisocyanate), xylylenediamine (to obtain xylylene diisocyanate), bis(aminomethyl)cyclohexane (to obtain bis(isocyanatomethyl)cyclohexane), bis(aminomethyl)norbornane (to obtain bis(isocyanatomethyl)norbornane), hexahydrotolylenediamine (to obtain hexahydrotolylene diisocyanate), 4,4'-diaminodicyclohexylmethane (to obtain 4,4'-diisocyanatodicyclohexylmethane), 1,6-hexamethylenediamine (to obtain hexamethylene diisocyanate), 1,5-pentamethylendiamine (to obtain pentamethylene diisocyanate) and isophoronediamine (to obtain isophorone diisocyanate).

In a twenty-fifth embodiment of the invention which may be combined with all embodiments comprising a liquid or gas phase phosgenation, in particular comprising a gas phase phosgenation, the amine employed is tolylenediamine (to obtain tolylene diisocyanate).

In a twenty-sixth embodiment of the invention which is a particular configuration of the twenty-fifth embodiment, X=2.

In a twenty-seventh embodiment of the invention which is a particular configuration of the twenty-third embodiment, the amine employed is a mixture of di- and polyamines of the diphenylmethane series (to obtain di- and polyisocyanates of the diphenylmethane series).

In a twenty-eighth embodiment of the invention which is a particular configuration of the twenty-seventh embodiment, X=1.

In a twenty-ninth embodiment of the invention which is a further particular configuration of the twenty-first embodiment, the amine is selected from the group consisting of hexamethylenediamine (to obtain hexamethylene diisocyanate), pentamethylenediamine (to obtain pentamethylene diisocyanate) and isophoronediamine (to obtain isophorone diisocyanate).

In a thirtieth embodiment of the invention which is a particular configuration of the twenty-ninth embodiment, X=1.

In a thirty-first embodiment of the invention which may be combined with all other embodiments, the final distillation is supplied with a product mixture comprising aromatic solvent of formula $C_6H_{6-X}Cl_X$ in a mass fraction based on its total mass in the range from 8% to 49%.

In a thirty-second embodiment of the invention which may be combined with all other embodiments, the final distillation is supplied with a product mixture comprising aromatic solvent of formula $C_6H_{6-X}Cl_X$ in a mass fraction based on its total mass in the range from 10% to 30%.

In a thirty-third embodiment of the invention which may be combined with all other embodiments, the discharged stream comprising aromatic solvent of formula $C_6H_{6-Y}Cl_Y$ contains said solvent (i.e. the aromatic solvent of formula $C_6H_{6-Y}Cl_Y$) in a mass fraction based on its total mass (i.e. the total mass of the discharged stream) in the range from 1.0% to 10%.

In a thirty-fourth embodiment of the invention which may be combined with all other embodiments, the discharged stream comprising aromatic solvent of formula $C_6H_{6-Y}Cl_Y$ contains said solvent (i.e. the aromatic solvent of formula $C_6H_{6-Y}Cl_Y$) in a mass fraction based on its total mass (i.e. the total mass of the discharged stream) in the range from 1.5% to 5.0%.

In a thirty-fifth embodiment of the invention which may be combined with all other embodiments, the discharged stream comprising aromatic solvent of formula $C_6H_{6-Y}Cl_Y$ contains said solvent (i.e. the aromatic solvent of formula $C_6H_{6-Y}Cl_Y$) in a mass fraction based on its total mass (i.e. the total mass of the discharged stream) in the range from 2.2% to 3.0%.

DETAILED DESCRIPTION

The embodiments briefly outlined above and further possible embodiments of the invention are more particularly elucidated hereinbelow. The embodiments may be combined with one another as desired unless otherwise stated or unambiguously apparent from the context.

Step (A) of the process according to the invention, namely reacting an amine with a stoichiometric excess of phosgene to obtain a liquid product mixture comprising the isocyanate and the aromatic solvent employed (in addition to a gaseous product mixture containing phosgene and hydrogen chloride) may in the context of the present invention be performed as is known in principle from the prior art. As described at the outset there are two fundamental process variants, namely liquid phase and gas phase phosgenation. Liquid phase phosgenation is always carried out in the presence of a solvent as diluent (variant (a)). However, in the gas phase phosgenation too, the reaction may be carried out in the presence of the vapors of a solvent as diluent. The addition of a solvent (or a mixture containing not only the solvent but also proportions of the desired isocyanate) for rapid cooling of the reaction mixture (variant (b)) is preferably employed in the gas phase reaction regime.

The reaction of the primary amine with phosgene in step (A) is preferably carried out continuously irrespective of the process regime.

Examples of liquid phase phosgenations are described in DE 37 44 001 C1, EP 0 314 985 A1, EP 1369 412 A1, DE-A-102 60 027, DE-A-102 60 093, DE-A 103 10 888, DE-A-10 2006 022 448, US-A 2007/0299279 and the literature cited in each of these. The liquid phase phosgenation comprises variant (a) in step (A). Variant (b), the so-called quench, is generally not necessary.

The process according to the invention allows phosgenation preferably of amines selected from the the di- and polyamines of the diphenylmethane series (to obtain di- and polyisocyanates of the diphenylmethane series), naphthalenediamine (to obtain naphthalene diisocyanate), tolylenediamine (to obtain tolylene diisocyanate), xylylenediamine (to obtain xylylene diisocyanate), bis(aminomethyl)cyclohexane (to obtain bis(isocyanatomethyl)cyclohexane), bis(aminomethyl)norbornane (to obtain bis(isocyanatomethyl) norbornane), hexahydrotolylenediamine (to obtain hexahydrotolylene diisocyanate), 4,4'-diaminodicyclohexylmethane (to obtain 4,4'-diisocyanatodicyclohexylmethane), 1,6-hexamethylenediamine (to obtain hexamethylene diisocyanate), 1,5-pentamethylendiamine (to obtain pentamethylene diisocyanate) and isophoronediamine (to obtain isophorone diisocyanate).

Tolylenediamine and the di- and polyamines of the diphenylmethane series are particularly preferred and the di- and polyamines of the diphenylmethane series are especially preferred. To this end, a mixture of the di- and polyamines of the diphenylmethane series are phosgenated in a manner known per se to afford a corresponding mixture of the di- and polyisocyanates of the diphenylmethane series (=MDI), wherein preferably monochlorobenzene (X=1) is employed as solvent in step (A) (though dichlorobenzene (X=2) is in principle also employable). The workup (step (B)) of the product mixture obtained in step (A) in the case of MDI preferably also comprises a step of separating a fraction of diisocyanates of the diphenylmethane series (=MMDI; "monomeric MDI") to obtain an MDI mixture depleted in diisocyanates of the diphenylmethane series which is followed by a further final distillation of the separated monomeric MDI fraction (in the case of the remaining MDI mixture depleted in diisocyanates of the diphenylmethane series, the separation of the monomeric MDI is to be considered a "final distillation"). The requirements according to the invention for the residual content of this solvent in the product stream relate to the MDI mixture depleted in monomeric MDI and to the isolated MMDI itself.

In a preferred embodiment of the liquid phase phosgenation, the procedure is as follows:

The primary amine and phosgene reactants are dissolved separately in a solvent. Suitable solvents for this purpose are monochlorobenzene (X=1) and dichlorobenzene (X=2), the latter in the form of the ortho or para isomer, preferably the ortho isomer. The primary amine is preferably used in a concentration of 10% by mass to 40% by mass, preferably of 10% by mass to 20% by mass, based on the total mass of the solution. Phosgene is preferably used in a concentration of 10% by mass to 40% by mass, preferably of 25% by mass to 35% by mass, based on the total mass of the solution.

Efficient mixing of primary amine and phosgene is of high significance in the liquid phase process. Static mixing devices (preferably nozzles) and dynamic mixing devices (containing mechanically moving parts) are used for this purpose in the prior art. After the mixing, the mixed reactants pass through a reaction zone to complete the conversion. Mixing device and reaction zone may also be disposed in a common reactor. Phosgene is employed in stoichiometric excess over the primary amino groups of the amine, in particular in a molar ratio of phosgene to primary amino groups in the range from 4.0:1 to 1.1:1, particularly preferably in the range from 3.0:1 to 1.1:1, very particularly preferably in the range from 2.0:1 to 1.1:1.

The liquid phase phosgenation may be performed at various temperature and pressure levels. The liquid phase phosgenation may thus be performed for example at a temperature in the range from 0° C. to 250° C., preferably from 20° C. to 200° C., and at a pressure in the range from 1.0 $\text{bar}_{(abs.)}$ to 70 $\text{bar}_{(abs.)}$, preferably from 1.0 $\text{bar}_{(abs.)}$ to 50 $\text{bar}_{(abs.)}$.

In a preferred embodiment, the hydrogen chloride formed as a coproduct in the reaction is present partially in dissolved form in the liquid phase and is partially outgassed. The proportion of the dissolved hydrogen chloride compared to that in gaseous form depends on the temperature and pressure level chosen.

In another embodiment the temperature and pressure level are chosen such that hydrogen chloride is initially present substantially in completely dissolved or liquefied form and a gas phase is formed only after intentional decompression (for example in a gas/liquid separator). In the terminology of the present invention such a decompression is an integral part of step (A).

Thus, in any case at the end of step (A) a liquid stream comprising the isocyanate to be prepared and solvent, and a gaseous stream comprising hydrogen chloride and optionally evaporated solvent, are obtained. Since phosgene is used in a superstoichiometric amount, both streams additionally contain phosgene. Both streams may be withdrawn directly from the reaction zone. It is also possible to withdraw a biphasic product of the process (containing a liquid phase and a gas phase) from the reaction zone and transfer it into an apparatus for phase separation. This phase separation may be carried out in all apparatuses known to those skilled in the art that are suitable for separation of gas and liquid phases. It is preferable to employ gas and liquid separators such as for example cyclone separators, deflection separators and/or gravitational separators with or without a static separation aid. It is likewise possible to assist the phase separation by reducing the pressure compared to the pressure in the reaction zone, owing to enhanced outgassing of hydrogen chloride (and of any other gaseous constituents). The liquid stream withdrawn from the reaction zone or,—if present—the liquid stream withdrawn from the apparatus for phase separation arranged downstream of the reaction zone, is in this embodiment the starting material for the workup to be performed in step (B), i.e. in the terminology of the present invention this liquid phase is the "liquid product mixture comprising the isocyanate and the employed aromatic solvent".

Using the example of the primary amine TDA, the liquid phase phosgenation is more particularly illustrated hereinbelow:

In the liquid phase process the TDA, dissolved in one of the solvents defined hereinabove, is supplied to the mixing with phosgene at a temperature in the range from –10° C. to 220° C., preferably from 0° C. to 200° C., particularly preferably from 20° C. to 180° C. The phosgene is supplied to the mixing with TDA, also in one of the solvents defined hereinabove, at a temperature in the range from –40° C. to 200° C., preferably from –30° C. to 170° C., particularly preferably from –20° C. to 150° C. The mixing of the TDA and phosgene solutions is in the liquid phase process preferably carried out using a static mixer or a dynamic mixer. Examples of suitable static mixers include nozzles or nozzle arrangements as described, for example, in DE 17 92 660 A, U.S. Pat. No. 4,289,732 or 4,419,295. Examples of suitable dynamic mixers include pump-like assemblies, for example centrifugal pumps (cf. U.S. Pat. No. 3,713,833) or specific mixer reactors (cf. EP 0 291 819 A, EP 0 291 820 A, EP 0 830 894 A).

The reaction in the downstream reaction zone is, in the liquid phase method, carried out at a temperature in the range from 0° C. to 250° C., preferably from 20° C. to 200° C., particularly preferably from 20° C. to 180° C., with an average residence time of the reaction mixture in the reaction zone in the range from 10 s to 5 h, preferably from 30 s to 4 h, particularly preferably from 60 s to 3 h, and at a pressure of up to 100 $bar_{(abs.)}$, preferably in the range from 1.0 $bar_{(abs.)}$ to 70 $bar_{(abs.)}$, particularly preferably from 1.0 $bar_{(abs.)}$ to 50 $bar_{(abs.)}$. Examples of process regimes usable in accordance with the invention, as regards the reaction in the reaction zone, are described, for example, in US-A 2007/0299279 (especially p. 7, paragraphs [0070], [0071], [0089]) and DE-A 103 10 888 (especially p. 5, paragraphs [0038], [0039]) and the documents cited in each of these.

Examples of gas phase phosgenations are described in EP 0 570 799 A1, EP 1 555 258 A1, EP 1 526 129 A1 and DE 101 61 384 A1, and, especially for aliphatic isocyanates, in EP 0 289 840 B1, EP 1 754 698 B1, EP 1 319 655 B1 and EP 1 362 847 B1. Advantages of this process over the otherwise customary liquid phase phosgenation include the energy-saving brought about by the minimization of a costly and complex solvent and phosgene circuit. The gas phase phosgenation comprises variant (b) in step (A). Variant (a), in the case of gas phase phosgenation the use of vapors of the aromatic solvent used in step (A) as diluent, is likewise possible but not necessary.

The process according to the invention allows phosgenation preferably of amines selected from the diamines of the diphenylmethane series (to obtain diisocyanates of the diphenylmethane series), tolylenediamine (to obtain tolylene diisocyanate), xylylenediamine (to obtain xylylene diisocyanate), bis(aminomethyl)cyclohexane (to obtain bis (isocyanatomethyl)cyclohexane), bis(aminomethyl)norbornane (to obtain bis(isocyanatomethyl)norbornane), hexahydrotolylenediamine (to obtain hexahydrotolylene diisocyanate), 1,6-hexamethylenediamine (to obtain hexamethylene diisocyanate), 1,5-pentamethylendiamine (to obtain pentamethylene diisocyanate) and isophoronediamine (to obtain isophorone diisocyanate). Particular preference is given to tolylenediamine, wherein preferably dichlorobenzene (X=2), in particular the ortho isomer, is employed as solvent in step (A). To this end, tolylenediamine which is in the form of a mixture of different isomers, in particular 2,4- and 2,6-tolylenediamine (meta-tolylenediamine), is phosgenated in a manner known per se to afford a corresponding mixture of the tolylene diisocyanate isomers (=TDI), wherein, as mentioned hereinabove, preferably dichlorobenzene (X=2), in particular the ortho isomer, is employed as solvent in step (A) (though monochlorobenzene (X=1) may also be used in principle).

In a preferred embodiment of the gas phase phosgenation the procedure is as follows:

Initially, a gaseous stream of a primary amine is provided. Suitable methods for this purpose are known in principle to those skilled in the art. Preferred embodiments are specified hereinbelow.

The primary amine can be converted to the gas phase in all evaporation apparatuses known from the prior art, especially in a falling-film evaporator. Preference is given to using those evaporation apparatuses in which a small volume of working contents is guided over a falling-film evaporator with a high circulation power.

To minimize the thermal stress on the amine it is preferable, independently of the precise configuration of the evaporation apparatus, to assist the evaporation operation through introduction of an inert gas such as $N_2$, He, Ar (in particular $N_2$) or the vapors of a solvent. Suitable solvents for this purpose are monochlorobenzene (X=1) and dichlorobenzene (X=2), the latter in the form of the ortho or para isomer, preferably the ortho isomer.

The evaporation—and if required superheating—of the starting amine (especially to a temperature in the range from 200° C. to 430° C., preferably 250° C. to 420° C., particularly preferably 250° C. to 400° C.) is preferably carried out in single- or multi-stage, preferably multi-stage, fashion in order to avoid unevaporated droplets in the gaseous amine stream to the greatest possible extent. Especially preferred are multi-stage evaporation and superheating steps in which droplet separators are installed between the evaporation and superheating systems (at at least one point, i.e. between at least one evaporation system and the subsequent superheating system or else between each evaporation system and the subsequent superheating system) and/or the evaporation apparatuses also have the function of a droplet separator. Suitable droplet separators are known to those skilled in the art.

In a further step a gaseous phosgene stream is provided. It is preferable to establish a molar ratio of phosgene to primary amine groups of 1.1:1 to 20:1, particularly preferably 1.2:1 to 5.0:1. As described hereinabove for the primary amine, the phosgene too is preferably heated to a temperature in the range from 200° C. to 430° C., preferably 250° C. to 420° C., particularly preferably 250° C. to 400° C., and optionally diluted with an inert gas such as $N_2$, He, Ar (in particular $N_2$) or with the vapors of an inert solvent as defined hereinabove for the amine.

The gaseous reactants primary amine and phosgene are mixed in a mixing zone and reacted in a reaction zone arranged downstream thereof. The separately heated amine and phosgene reactants are preferably supplied to the mixing and reaction via a nozzle arrangement. The nozzle arrangement for introduction of the amine and phosgene reactant gas streams may be configured in various ways known to those skilled in the art; examples may be found, for example, in EP 2 199 277 B1, paragraphs [0017] to [0019], EP 1 449 826 B1, paragraphs [0011] to [0012], EP 1 362 847 B1, paragraphs [0011] to [0012], EP 1 526 129 B1, paragraphs [0009] to [0011] and EP 1 555 258 B1, paragraphs [0008] to [0011].

In addition to the abovementioned option of diluting the gaseous stream of the primary amine and the gaseous phosgene stream, it is also possible to run a separate dilution gas stream (an inert gas such as $N_2$, He, Ar, especially $N_2$) or the vapors of an inert solvent as defined hereinabove for the amine directly into the mixing. In this case, this diluent gas stream is preferably heated to a temperature in the range from 100° C. to 500° C., preferably 150° C. to 450° C., particularly preferably 150° C. to 400° C.

The further conversion in the reaction zone of the primary amine and phosgene reactants that have been mixed in the mixing zone is preferably effected in an adiabatic manner. Adiabatic conversion means that controlled removal of the resultant heat of reaction by a heat transfer medium is dispensed with. Therefore, the reaction enthalpy—apart from unavoidable heat losses—is reflected quantitatively in the temperature differential of product gas stream and reactant gas stream.

In the reaction zone amine and phosgene are rapidly converted into the corresponding isocyanate, preferably adiabatically. The reaction is preferably conducted such that the amine is fully converted before entry into the quench more particularly described hereinbelow.

The so-called quench brings about, in a quench zone, a rapid cooling and (apart from trace amounts remaining in the gas phase) liquefaction of the isocyanate formed (quench) by contacting with a quench liquid in a quench zone. Suitable quench liquids include the abovementioned solvents and mixtures of the isocyanate to be prepared with the recited solvents. The contacting is preferably effected by injecting the quench liquid into the gaseous stream of the reaction product mixture. Options for the construction and operation of a quench zone are known in principle from the prior art. The apparatuses and methods of the prior art can also be used in the context of the present invention. Possible configurations of the quench zone are disclosed, for example, in EP 1 403 248 A1 and EP 1 935 875 A1. The temperature of the quench liquid employed in the quench is preferably chosen such that it is on the one hand high enough to cleave the carbamoyl chloride corresponding to the isocyanate to isocyanate and hydrogen chloride. (It is in no way certain whether the carbamoyl chloride intermediate known from the liquid phase phosgenation will also be formed in the gas phase phosgenation. Since, however, it is independently conceivable that liquefied isocyanate reacts partly with the hydrogen chloride gas present in the quench to give the carbamoyl chloride, the temperature of the quench liquid should be high enough to suppress this reaction.) On the other hand, isocyanate and any solvent additionally used as diluent in the gaseous amine stream and/or gaseous phosgene stream should condense as far as possible or dissolve as far as possible in the solvent, while excess phosgene, hydrogen chloride and any inert gas used additionally as diluent pass through the quench zone uncondensed and undissolved as far as possible, so that the temperature of the quench liquid chosen must not become too high either. Quench liquids particularly suitable for selectively obtaining the isocyanate from the gaseous reaction mixture are those kept at a temperature of 50° C. to 200° C., preferably 80° C. to 180° C. The mixture obtained in the quench zone contains gaseous proportions and liquid proportions, i.e. is biphasic. This biphasic mixture is sent to a collecting zone for phase separation. The liquid phase and gaseous phase are preferably withdrawn continuously from the collecting zone. In this embodiment, the liquid phase thus obtained is the starting material for the workup to be performed in step (B), i.e. this liquid phase is the liquid product mixture comprising the isocyanate and the employed aromatic solvent.

In a preferred embodiment, mixing zone, reaction zone, quench zone and collecting zone are arranged in said sequence from top to bottom in an upright, especially conical or cylindrical or conical-cylindrical, reactor. In this embodiment the mixture generated in the quench flows by gravity into the collecting zone. In another arrangement of the collecting zone, it may be necessary under some circumstances to pump the mixture of reaction product mixture and quench liquid into the collecting zone.

After the phosgenation in step (A), step (B) comprises the workup of the liquid product mixture from (A), i.e. isolating the isocyanate from the liquid product mixture obtained in step (A) to obtain the isocyanate with a mass fraction, based on its total mass, of aromatic solvent of formula $C_6H_{6-Y}Cl_Y$ in the range from 0.0 ppm to 9.9 ppm, preferably 0.0 ppm to 5.0 ppm, particularly preferably 0.0 ppm to 3.0 ppm. According to the invention, step (B) comprises at least a final distillation step and preferably at least one distillation step arranged upstream of the final distillation, in particular a solvent distillation for separation of aromatic solvent of formula $C_6H_{6-X}Cl_X$. In certain embodiments step (B) also comprises a dephosgenation for separating dissolved phosgene from the liquid product mixture obtained in step (A), wherein the dephosgenation need not necessarily be configured as a distillation (see below). In certain cases it may also be necessary to arrange a dedicated distillation step for separation of so-called residue (very high boiling byproducts of the phosgenation) upstream of the final distillation (residue separation). The steps outlined only briefly here are more particularly elucidated hereinbelow.

It is preferable when the step of the final distillation and, if performed, the distillation steps arranged upstream thereof are performed continuously so that a stream of isolated isocyanate is continuously obtained. The mass fraction of aromatic solvent of formula $C_6H_{6-Y}Cl_Y$ is then determined in this continuously obtained stream of isolated isocyanate, especially at intervals of 1 hour to 16 hours, preferably of 4 hours to 12 hours. In the case of a discontinuous configuration of step (B) the isolated isocyanate is obtained discontinuously, i.e. batchwise. The mass fraction of aromatic solvent of formula $C_6H_{6-Y}Cl_Y$ is then preferably determined in each batch. Once the operating conditions for step (B) have been optimized for a sufficiently low mass fraction of aromatic solvent of formula $C_6H_{6-Y}Cl_Y$, the measurement frequency may also be reduced irrespective of whether the isolated isocyanate is obtained continuously or batchwise.

Likewise independently of whether the isolated isocyanate is obtained continuously or batchwise, any determined deviation from the mass fraction of aromatic solvent of formula $C_6H_{6-Y}Cl_Y$ provided for according to the invention is countered by increased discharging of aromatic solvent of formula $C_6H_{6-Y}Cl_Y$.

Examples of the workup of phosgenation products are described in EP-A-1 413 571 (TDI), US 2003/0230476 A1 (TDI) and EP 0289 840 B1 (HDI, IDPI and $H_{12}$-MDI). The basic procedures described therein may in principle also be employed in the process according to the invention. This is the case provided the discharging required according to the invention of at least one stream comprising one additional chlorine-containing aromatic solvent $C_6H_{6-Y}Cl_Y$ can be incorporated into these procedures such that the purity requirements in respect of the concentration of $C_6H_{6-Y}Cl_Y$ in the desired isocyanate are satisfied.

As already mentioned hereinabove, optionally dissolved phosgene (and dissolved hydrogen chloride) is initially separated from the liquid product mixture obtained in step (A) in a separate step. This process regime is preferred especially when the phosgenation in step A) is performed in the liquid phase because the liquid crude product obtained in a liquid phase phosgenation tends to contain significantly higher proportions of dissolved phosgene and dissolved hydrogen chloride than that obtained in a gas phase phosgenation. This so-called dephosgenation step may in principle be performed in any manner known to those skilled in the art, especially by distillation, absorption or a combination of the two.

After the dephosgenation step or—especially when performing step a) in the gas phase—immediately after step (A) there preferably follows, as already mentioned hereinabove, a separation of employed aromatic solvent $C_6H_{6-X}Cl_X$ (more precisely: a majority thereof, namely enough to obtain a liquid product mixture depleted in aromatic solvent of formula $C_6H_{6-X}Cl_X$ whose mass fraction, based on its total mass, of aromatic solvent of formula $C_6H_{6-X}Cl_X$ is in the range from 8% to 49%, preferably 10% to 30%) in a separate step. This solvent separation is carried out by distillation (solvent distillation). The solvent separated in this way may, if required, be subjected to a solvent purification for separation of phosgene present therein (=solvent dephosgenation). This is preferably done by distillation in a solvent dephosgenation column to obtain purified solvent containing phosgene and isocyanate at most in traces as the bottoms product. However, such a distillation performed for dephosgenation cannot achieve separation of the solvent employed from the one additional chlorine-containing aromatic solvent since both are obtained together in the bottom of the dephosgenation column. For economic reasons it is sought to recycle recovered, optionally dephosgenated, solvent to step (A). Recovered, optionally dephosgenated, solvent of formula $C_6H_{6-X}Cl_X$ may also contain proportions of the higher-boiling solvent of formula $C_6H_{6-Y}Cl_Y$ (while other proportions thereof remain in the liquid product mixture depleted of solvent of formula $C_6H_{6-X}Cl_X$ from the bottom of the solvent distillation). If this is the case the solvent of formula $C_6H_{6-X}Cl_X$ is thus obtained in the solvent distillation in a mixture with solvent of formula $C_6H_{6-Y}Cl_Y$ and so in one embodiment of the invention the entirety of this mixture can be recycled to step (A). In this case the discharging of a stream comprising aromatic solvent of formula $C_6H_{6-Y}Cl_Y$ which is essential to the invention is shifted entirely to the downstream step of the final purification (=final distillation) of the isocyanate. However, it is also possible to perform this discharging which is essential to the invention at least partially already in this step of the solvent separation. Embodiments suitable therefor are described hereinbelow:

In such an embodiment of the invention the solvent distillation is thus configured such that the aromatic solvent of formula $C_6H_{6-X}Cl_X$ separated in the solvent distillation is obtained in a mixture with aromatic solvent of formula $C_6H_{6-Y}Cl_Y$, wherein a first portion of the mixture (optionally after solvent dephosgenation; see above) is recycled into step (A) and a second portion of the mixture is not recycled into step (A) but is (at intervals or continuously) discharged and subsequently incinerated or otherwise employed but not recycled into the process. Incineration is preferred. In this embodiment of the invention, the described separation of the second portion of the mixture (deliberately eschewing recycling thereof into the process) constitutes the discharging of a stream comprising aromatic solvent of formula $C_6H_{6-Y}Cl_Y$ which is essential to the invention or a portion thereof (if there are other discharging points).

The corresponding configuration of the solvent distillation is effected by establishing suitable conditions of temperature, pressure, reflux ratio and/or number of theoretical plates in this distillation. It goes without saying that the precise conditions to be chosen depend on the type of the aromatic solvent employed in step (A), the amine and the concentration both of the isocyanate and the one additional chlorine-containing aromatic solvent in the starting mixture to be distilled and may readily be determined for each application by those skilled in the art. Simple preliminary experiments to identify the optimal distillation parameters may in some cases be necessary.

Alternatively to the discharging of the second portion of the mixture obtained in the solvent distillation, the second portion of the mixture may be purified in a further distillation (in the terminology of the present invention an integral part of the solvent distillation and thus a distillation step arranged upstream of the final distillation), wherein aromatic solvent of formula $C_6H_{6-X}Cl_X$ is separated from the second portion of the mixture and then (optionally after solvent dephosgenation) at least partially, especially completely, recycled into step (A). It is of course likewise possible to purify all of the mixture separated in the solvent distillation in a further distillation and separate aromatic solvent of formula $C_6H_{6-X}Cl_X$ from the mixture and then (optionally after solvent dephosgenation) at least partially, especially completely, recycle it into step (A).

Irrespective of whether only the second portion of the mixture or its entirety is sent to the above-described further distillation, the one additional chlorine-containing aromatic solvent $C_6H_{6-Y}Cl_Y$, on account of its comparatively high boiling point, accumulates in the bottoms of this further distillation and thus exits said distillation via the bottoms stream while a stream of aromatic solvent of formula $C_6H_{6-X}Cl_X$ (which contains the one additional chlorine-containing aromatic solvent $C_6H_{6-Y}Cl_Y$ at most in immaterial proportions) is obtained as tops stream. The bottoms stream of this further distillation is therefore discharged and incinerated or otherwise employed but not recycled into the process. Incineration is preferred. In this embodiment of the invention, the described separation of the bottoms stream of the further distillation (deliberately eschewing recycling thereof into the process) constitutes the discharging of a stream comprising aromatic solvent of formula $C_6H_{6-Y}Cl_Y$, which is essential to the invention, or a portion thereof (if there are other discharging points).

The discharging of a portion (the second portion) of the mixture obtained in the solvent distillation and/or the purification of a portion of this mixture/the total mixture in a further distillation followed by the discharging of the bottoms stream of this further distillation are here to be undertaken such that one additional chlorine-containing aromatic solvent $C_6H_{6-Y}Cl_Y$ is discharged from the process to a sufficient extent. The precise conditions (such as for instance the molar ratio of the first portion to the second portion of the mixture and/or the precise configuration of the further distillation and/or the frequency of the discharging when performing same at intervals) depend on the boundary conditions of the individual case and may readily be determined by those skilled in the art, optionally by performing preliminary experiments. Also included among the relevant process conditions is whether there are further points in the process for discharging one additional chlorine-containing aromatic solvent $C_6H_{6-Y}Cl_Y$.

This is because the discharging of the one additional chlorine-containing aromatic solvent to an extent sufficient for the purposes of the present invention solely in the solvent distillation is costly and inconvenient, though possible in principle. It is therefore preferable to undertake the discharging of the one additional chlorine-containing aromatic solvent predominantly or completely in the final purification step described hereinbelow.

The product mixture to be supplied to the final purification (=final distillation) in particular contains aromatic solvent of formula $C_6H_{6-X}Cl_X$ in a mass fraction based on its total mass in the range from 8% to 49%, preferably 10% to 30%, independently of whether the final purification has a solvent separation arranged upstream of it or not (i.e. a solvent content in the recited ranges is established either through the choice of the conditions in the solvent separation or is automatically established as a consequence of the reaction conditions in step (A)). This final purification of the isocyanate to be prepared is carried out by distillation for separation of the remaining low-boiling and high-boiling organic secondary components (=low and high boilers) and of any remaining solvent and optionally of any remaining residual constituents of hydrogen chloride and phosgene. Any remaining solvent, hydrogen chloride and phosgene are likewise lower-boiling than the isocyanate to be prepared and are therefore predominantly to completely separated together with the low-boiling organic secondary components. The final distillation may in turn be made up of substeps such that the separation of the low boilers and the high boilers is carried out in two serially arranged distillation columns. However it is likewise possible to perform these separation operations in one step (i.e. in a single distillation column) using a dividing wall column.

Step (B) preferably also comprises (especially when performing step (A) in the gas phase) a workup of the gaseous product mixture obtained in step (A) for separation of any isocyanate present therein. This is preferably effected by means of a scrubbing of the gaseous product mixture with the employed aromatic solvent $C_6H_{6-X}Cl_X$. The solvent of formula $C_6H_{6-X}Cl_X$ used for this purpose need not be 100% pure in respect of one additional chlorine-containing aromatic solvent $C_6H_{6-Y}Cl_Y$. The isocyanate-solvent mixture obtained in the scrubbing may be sent to the workup of the liquid product mixture from step (A).

Possible embodiments for step (B) are hereinbelow described in detail using the example of a particularly preferred isocyanate, TDI, wherein initially only the basic setup of preferred distillation sequences is elucidated with reference to different variants (1 to 4). It goes without saying that this basic setup is not limited to the workup of TDI. It will subsequently be elucidated how the process according to the invention may be implemented in the specified distillation sequences.

Variant 1

Variant 1, which is suitable particularly when step A) is performed in the liquid phase, is described in principle in Chem System's PERP Report for TDI/MDI (Chem Systems, Process Evaluation Research Planning TDI/MDI 98/99 S8, Tarrytown, N.Y., USA: Chem Systems 1999, p. 27 to 32). In this variant, the liquid reaction mixture after completed distillative separation of hydrogen chloride and phosgene still contains a solvent content based on its total mass of >50% by mass, preferably 51% by mass to 85% by mass, particularly preferably 55% by mass to 65% by mass. This mixture is sent to a solvent separation, wherein initially in a pre-evaporator a solvent-TDI mixture is distilled off into a solvent distillation column. In the solvent distillation column solvent is distilled off and recycled to the front-end section of the process. The bottoms stream from this solvent distillation contains, based on the total mass of the bottoms, not only TDI but especially also preferably 15% by mass to 25% by mass of solvent based on the total mass of this bottoms stream. This stream is passed into a so-called intermediate column in which further solvent is distilled off and the bottoms product freed of solvent is sent to a last distillation column for purification of the TDI. Said column is operated at negative pressure and affords the saleable purified isocyanate TDI as distillate stream. A portion of the TDI remains in the distillation bottoms stream of this last distillation column. The functions of the intermediate column and the distillation column for TDI purification may also be combined in one dividing wall column, in particular as described in EP 1 371 635 A1, to obtain a tops stream of low boilers and solvent, pure TDI in the region of the dividing wall and a product stream containing TDI and higher-boiling components (distillation residue) as a distillation bottoms stream.

Variant 2

In contrast to variant 1 in this embodiment the liquid reaction mixture after completed distillative separation of hydrogen chloride and phosgene retains a solvent content, based on its total mass, of only ≤50.0% by mass. This mixture is sent to a pre-evaporator and a solvent-TDI mixture is distilled off therefrom into a distillation column. In this variant the TDI is freed of solvent already in the latter distillation column and the bottoms stream from this distillation column can therefore be passed into the TDI purification column, with the result that this variant comprises one less column than variant 1. The TDI purification column is operated at negative pressure and affords the saleable purified isocyanate TDI as distillate stream. The functions of the TDI purification column and the distillation column arranged upstream thereof may also be combined in one dividing wall column, in particular as described in EP 1 413 571 A1, to obtain a tops stream of low boilers and solvent, pure TDI in the region of the dividing wall and a product stream containing TDI and higher-boiling components (distillation residue) as a distillation bottoms stream.

Variant 3

Variant 3 comprises the distillation sequences described in variants 2 and 1 but without the pre-evaporator mentioned in each case. In this case the proportion of distillation residue in the described distillation sequences is included in the liquid mass flows up to the respective final TDI purification column. This process is likewise known in principle (EP 1 717 223 A2).

Variant 4

This variant is especially employed when step (A) is performed in the gas phase. Since the liquid crude process product obtained in a gas phase phosgenation contains dissolved phosgene and dissolved hydrogen chloride at most in a relatively small amount (i.e. compared to liquid phase phosgenation), separate removal of phosgene and hydrogen chloride is preferably eschewed. In this embodiment the liquid product mixture is therefore either sent directly to a solvent separation in which solvent and any dissolved hydrogen chloride and any dissolved phosgene are distillatively separated overhead or—if the solvent content is sufficiently low—sent directly to a TDI purification column for final distillation. In both cases, the TDI purification column is preferably configured as a dividing wall column. Low boilers (i.e. byproducts that are lower-boiling than TDI, any hydrogen chloride still present, any phosgene and solvent still present and any inert gases) are withdrawn from the TDI purification column overhead. The tops stream may further contain small amounts of entrained TDI. The purified TDI is removed as distillate stream in the region of the dividing wall. The obtained distillation bottoms stream contains so-called distillation residue and a certain amount of TDI, which in order to keep the distillation bottoms stream processable (flowable) is not distilled off, and possibly traces of solvent. It goes without saying that instead of a dividing wall column it is also possible to employ two serially arranged non-dividing wall distillation columns. In this latter embodiment the low boilers are withdrawn at the top of the first distillation column and the bottoms stream from the first distillation column forms the feed to the second distillation column. Purified TDA is withdrawn from the second distillation column as distillate stream while the bottoms stream from the second distillation column contains the distillation residue in a mixture with TDI.

In this variant 4 the solvent separation—if performed—is preferably performed at a temperature in the range from 160° C. to 200° C. and at a pressure in the range from 160 mbar to 220 mbar, wherein both ranges relate to the bottom of the distillation column employed.

Especially when performed in a dividing wall column the TDI final distillation is preferably performed at a temperature in the range from 160° C. to 200° C. and at a pressure in the range from 50 mbar to 100 mbar, wherein both ranges relate to the bottom of the employed distillation column.

In all of the described variants the final distillation of the TDI thus affords a low boiler tops stream, namely the tops stream from a dividing wall column or the tops stream from a distillation column arranged upstream of the non-dividing wall TDI purification column. The primary constituent of this low boiler tops stream is aromatic solvent $C_6H_{6-X}Cl_X$ employed. The total mass fraction of employed aromatic solvent ($C_6H_{6-X}Cl_X$) and one additional chlorine-containing aromatic solvent ($C_6H_{6-Y}Cl_Y$) in this tops stream based on its total mass is in particular 51% to 99%, particularly preferably 60% to 99% (wherein the remainder consists predominantly to completely of TDI). It goes without saying that this applies not only to TDI but also to all isocyanates amenable to final purification in the described manner (separation of the low and high boilers in two serially arranged distillation columns or in one dividing wall column). In the prior art it is customary to condense this low boiler tops stream obtained (initially in gaseous form) in the final distillation and to partially recycle the condensate obtained after separation of non-condensable proportions into the final distillation as reflux and partially discharge same from the final distillation and then recycle it to another point in the process. However, if the low boiler tops stream contains substantial proportions of one additional chlorine-containing aromatic solvent $C_6H_{6-Y}Cl_Y$, i.e. if the aromatic solvent of formula $C_6H_{6-X}Cl_X$ separated at this point is obtained in a mixture with aromatic solvent of formula $C_6H_{6-Y}Cl_Y$, this solvent recycling is problematic as has, surprisingly, been found in the context of the present invention. This is because this one additional chlorine-containing solvent $C_6H_{6-Y}Cl_Y$ on account of its comparatively high boiling point gradually accumulates in the condensate of the low boiler tops stream (no appreciable discharge as gas phase, for instance together with non-condensable gases) and thus, as a consequence of the solvent recycling, in the process, and thus ultimately contaminates the isocyanate to be isolated. In the context of the present invention this may be countered in various ways:

The requirements according to the invention for the purity of the isolated isocyanate are in this case most easily achieved when in contrast to the customary prior art, which provides for a recycling of the low boiler tops stream to another point in the process, the obtained mixture is (completely) discharged and sent for disposal, in particular incinerated. However, since desired products can only be thermally and not materially recovered it is preferable to recycle only a first portion of the mixture obtained at the top of the dividing wall column or at the top of the first distillation column to another point in the process (i.e. the process for preparing an isocyanate) and to (at intervals or continuously) discharge and then send for disposal, in particular incinerate (see also example 2), a second portion.

The recycling to another point in the process may be effected into step (A) or, in embodiments comprising the above-described scrubbing of the gaseous product mixture obtained in step (A) with aromatic solvent of formula $C_6H_{6-X}Cl_X$ for removal of isocyanate, preferably into this scrubbing.

Instead of discharging the second portion of the mixture obtained at the top of the dividing wall column or at the top of the first distillation column this second portion may also be purified in a further distillation (in the context of the terminology of the present invention an integral part of the final distillation), wherein aromatic solvent of formula $C_6H_{6-X}Cl_X$ is separated from the second portion of the mixture and subsequently at least partially, in particular completely, recycled to another point in the process. Step (A) and optionally the scrubbing of the gaseous product mixture obtained in step (A) (see example 4) are suitable therefor, as described hereinabove. Having regard to the further distillation, reference is made to what is stated above in connection with the solvent distillation. What is stated there applies correspondingly here. In particular, it is the case here too that the bottoms stream from the further distillation is discharged and incinerated or otherwise employed but not recycled into the process. Incineration is preferred.

It is of course likewise possible to purify all of the mixture obtained at the top of the dividing wall column or at the top of the first distillation column in a further distillation and separate aromatic solvent of formula $C_6H_{6-X}Cl_X$ from the mixture and then at least partially, especially completely, recycle it to another point in the process. Step (A) and optionally the scrubbing of the gaseous product mixture obtained in step (A) are again likewise suitable therefor.

The discharging of a portion (the second portion) of the mixture obtained at the top of the dividing wall column or at the top of the first distillation column and/or the purification of a portion of this mixture/the total mixture in a further distillation followed by the discharging of the bottoms stream of this further distillation are here to be undertaken such that one additional chlorine-containing aromatic solvent $C_6H_{6-Y}Cl_Y$ is discharged from the process to a sufficient extent. The precise conditions (such as for instance the molar ratio of the first portion to the second portion of the mixture and/or the precise configuration of the further distillation and/or the frequency of the discharging when performing same at intervals) depend on the boundary conditions of the individual case and may readily be determined by those skilled in the art, optionally by performing preliminary experiments. Naturally also included among the relevant boundary conditions is whether one additional chlorine-containing aromatic solvent $C_6H_{6-Y}Cl_Y$ has in part already been discharged at other points (such as the solvent purification).

Proportions of employed aromatic solvent $C_6H_{6-X}Cl_X$ missing as a result of the procedure according to the invention (the discharging of the one additional chlorine-containing aromatic solvent always also results in co-discharging of proportions of the employed aromatic solvent) are replaced by freshly supplied solvent $C_6H_{6-X}Cl_X$. It goes without saying that this is the case independently of the precise point at which one additional chlorine-containing aromatic solvent is discharged.

Since iron chlorides such as in particular iron(III) chloride bring about chlorination of the employed aromatic solvent it is possible to reduce this undesired chlorination reaction (and thus to reduce the content of one additional chlorine-containing aromatic solvent in the isolated isocyanate) by employing particularly corrosion resistant stainless steels at all critical points where corrosive material removal is known to take place or is feared and where significant solvent concentrations still occur. The following types are particularly suitable for this purpose:

1) Low-carbon austenitic nickel-molybdenum-chromium alloy having the following mass fractions based on total mass:
   Carbon: 0.01% to 0.015%,
   Silicon: 0% to 0.08%,
   Manganese: 0% to 1.00%,
   Phosphorus: 0% to 0.025%,
   Sulfur: 0% to 0.015%,
   Chromium: 14.0% to 18.0%,
   Molybdenum: 14.0% to 17.0%,
   Titanium: 0% to 0.70%,
   Copper: 0% to 0.50%,
   Cobalt: 0% to 2.00%,
   Iron: 0% to 3.00%,
   Nickel: Remainder to 100%:
   Type 2.4610 stainless steel, also known as "Hastelloy C4".
2) Austenitic special stainless steel having the following mass fractions based on total mass:
   Carbon: 0% to 0.02%,
   Sulfur: 0% to 0.010%,
   Nitrogen: 0.15% to 0.25%,
   Chromium: 20.0% to 21.0%,
   Nickel: 24.0% to 26.0%,
   Manganese: 0% to 1.0%,
   Silicon: 0% to 0.5%,
   Molybdenum: 6.0% to 7.0%,
   Copper: 0.5% to 1.5%,
   Phosphorus: 0% to 0.03%,
   Iron: Remainder to 100%:
   Type 1.4529 stainless steel.
3) High-alloy, low-carbon austenitic stainless steel having the following mass fractions based on total mass:
   Carbon: 0% to 0.2%,
   Manganese: 2%.
   Nickel: 23% to 28%,
   Chromium: 19% to 23%,
   Sulfur: 0% to 0.3%,
   Molybdenum: 4% to 5%,
   Nitrogen: 0% to 0.1%,
   Copper: 1% to 2%,
   Phosphorus: 0% to 0.03%,
   Silicon: 0% to 0.7%,
   Iron: Remainder to 100%:
   Type 1.4539 stainless steel.

The stainless steels should be employed especially in the workup downstream of the crude product container (tank container) for receiving the crude liquid product mixture of the reaction since in the actual reaction (i.e. in the reactor) stainless steels of particularly high quality are, in any case, already employed. Special attention should also be paid to pipe conduits that are used for connecting the crude product container to the employed distillation means and/or for connecting these distillation means to one another and to the bottoms container of the final distillation column and the bottoms piping thereof.

The invention is hereinbelow more particularly elucidated with reference to examples.

EXAMPLES

Reported amounts in percent and ppm are mass fractions based on the total mass of the respective material stream.

Examples 1 to 4 describe the workup (Step (B)) of a TDI product mixture obtained in a gas phase reaction (Step (A)) according to variant 4 (no separate dephosgenation but separate separation of the majority of the solvent in a solvent column upstream of the final distillation; final distillation in a dividing wall column). The solvent $C_6H_{6-X}Cl_X$ employed in the gas phase reaction as a means for cooling the reaction mixture was ortho-dichlorobenzene (ODB). The ODB-containing stream distilled off overhead in the dividing wall column was, after condensation, partially recycled into the dividing wall column as reflux and partially recycled into the process (namely into the scrubbing of the gaseous reaction product remaining in step (A) after the quench).

Example 1 (Comparative, without Discharging of a Stream Comprising Aromatic Solvent of Formula $C_6H_{6-Y}Cl_Y$)

The purified TDI withdrawn as a sidestream from the dividing wall column had a trichlorobenzene (TCB) concentration of 11 ppm. The low boiler stream withdrawn overhead contained 8.6% TDI, 88.6% ODB and 2.2% TCB. More highly chlorinated chlorobenzenes such as tetra-, penta- and hexachlorobenzene were not detectable with the employed gas chromatographic analytical method.

Example 2 (Inventive)

To achieve depletion of TCB, 1.9 t of the stream containing 8.6% TDI, 88.6% ODB and 2.2% TCB from the portion destined for recycling into the process were discharged and sent for external incineration on a one-off basis. This corresponds to the inventive discharging of a stream comprising aromatic solvent of formula $C_6H_{6-Y}Cl_Y$. The solvent recirculation circuit was depleted in TCB by a total of 42 kg.

This one-off depletion of TCB in the overall process had the result that the TCB concentration in the TDI sidestream from the dividing wall column fell from 11 ppm to 6 ppm over 12 h.

Example 3 (Comparative, without Discharging of a Stream Comprising Aromatic Solvent of Formula $C_6H_{6-Y}Cl_Y$; Process Simulation (VTPlan)

The composition of the tops stream of the TDI dividing wall column is as follows:
92.8% ODB,
5.1% TDI,
2.1% TCB.
The sidestream from the TDI dividing wall column (TDI product) contains 15 ppm TCB.

Example 4 (Inventive; Simulation as in Example 3)

300 kg/h of the TCB-rich tops stream from the portion destined for recycling into the process are diverted and passed into a downstream distillation column. This is a packed column with 24 theoretical plates operated at 70 mbar head pressure. ODB having a TCB content below 1 ppm is separated as tops product in this downstream distillation column. The thus-purified ODB is then likewise recycled into the process. As bottoms product from this downstream distillation column, 14.5 kg/h of a TCB-rich stream comprising 3.0% TCB, 96.9% TDI and 0.1% ODB are withdrawn, discharged and sent for external waste recovery. This corresponds to the discharging of a stream comprising aromatic solvent of formula $C_6H_{6-Y}Cl_Y$ according to the invention.

As a result of the continuous discharge, workup and recycling of purified solvent ODB, the composition of the tops stream from the dividing wall column changes as follows:
95.3% ODB,
4.56% TDI,
0.14% TCB.
This continuous removal of trichlorobenzene from the process reduces the contamination of trichlorobenzene in the TDI product from 15 ppm previously (example 3) to below 3 ppm.

The invention claimed is:

1. A process for preparing an isocyanate comprising:
   (A) reacting an amine with a stoichiometric excess of phosgene using an aromatic solvent of formula $C_6H_{6-X}Cl_X$, wherein X=1 or 2,
      (a) as a diluent during the reaction and/or
      (b) as a means for cooling the reaction mixture formed from the reaction of the amine with phosgene
   to obtain a liquid product mixture comprising the isocyanate, the aromatic solvent, and a gaseous product mixture containing phosgene and hydrogen chloride; and
   (B) isolating the isocyanate from the liquid product mixture obtained in step (A) by a process comprising a final distillation in which the isolated isocyanate is obtained as a product stream, wherein in the final distillation or in a distillation step upstream of the final distillation at least one stream comprising aromatic solvent of formula $C_6H_{6-Y}Cl_Y$, wherein Y=X+1, is discharged such that the isolated isocyanate has a mass fraction, based on its total mass, of aromatic solvent of formula $C_6H_{6-Y}Cl_Y$ of 0.0 ppm to 9.9 ppm.

2. The process as claimed in claim 1, wherein the liquid product mixture obtained in step (A) is, in step (B), prior to the final distillation, passed through a solvent distillation for separating aromatic solvent of formula $C_6H_{6-X}Cl_X$.

3. The process as claimed in claim 1, wherein in step (B) the final distillation:
   (i) is performed in a dividing wall column to obtain the product stream of isocyanate in a sidestream takeoff from the dividing wall column and aromatic solvent of formula $C_6H_{6-X}Cl_X$ at the top of the dividing wall column,
   or
   (ii) is performed in two serially arranged non-dividing wall distillation columns to obtain aromatic solvent of formula $C_6H_{6-X}Cl_X$ at the top of the first distillation column and the product stream of isocyanate as distillate from the second distillation column.

4. The process as claimed in claim 2, wherein, in step (B), the final distillation:
   (i) is performed in a dividing wall column to obtain the product stream of isocyanate in a sidestream takeoff from the dividing wall column and aromatic solvent of formula $C_6H_{6-X}Cl_X$ at the top of the dividing wall column,
   or
   (ii) is performed in two serially arranged non-dividing wall distillation columns to obtain aromatic solvent of formula $C_6H_{6-X}Cl_X$ at the top of the first distillation column and the product stream of isocyanate as distillate from the second distillation column.

5. The process as claimed in claim 4,
wherein the aromatic solvent of formula $C_6H_{6-X}Cl_X$ separated in the solvent distillation is obtained in a mixture with aromatic solvent of formula $C_6H_{6-Y}Cl_Y$, wherein a first portion of the mixture obtained in the solvent distillation is recycled into step (A) and a second portion of the mixture obtained in the solvent distillation is not recycled into step (A) but is discharged, or wherein the aromatic solvent of formula $C_6H_{6-X}Cl_X$ separated in the solvent distillation is obtained in a mixture with aromatic solvent of formula $C_6H_{6-Y}Cl_Y$, wherein a first portion of the mixture obtained in the solvent distillation is recycled into step (A) and a second portion of the mixture obtained in the solvent distillation is purified in a further distillation, wherein aromatic solvent of formula $C_6H_{6-X}Cl_X$ is separated from the second portion of the mixture obtained in the solvent distillation and subsequently recycled into step (A), wherein the portion of the second portion of the mixture obtained in the solvent distillation remaining after the separation of the aromatic solvent of formula $C_6H_{6-X}Cl_X$ from the second portion of the mixture obtained in the solvent distillation is discharged, or wherein the aromatic solvent of formula $C_6H_{6-X}Cl_X$ separated in the solvent distillation is obtained in a mixture with aromatic solvent of formula $C_6H_{6-Y}Cl_Y$, wherein the mixture obtained in the solvent distillation is purified in a further distillation, wherein aromatic solvent of formula $C_6H_{6-X}Cl_X$ is separated from the mixture obtained in the solvent distillation and subsequently recycled into step (A), wherein the portion of the mixture obtained in the solvent distillation remaining after the separation of the aromatic solvent of formula $C_6H_{6-X}Cl_X$ from the mixture obtained in the solvent distillation is discharged.

6. The process as claimed in claim 2,
wherein the aromatic solvent of formula $C_6H_{6-X}Cl_X$ separated in the solvent distillation is obtained in a mixture with aromatic solvent of formula $C_6H_{6-Y}Cl_Y$, wherein a first portion of the mixture obtained in the solvent distillation is recycled into step (A) and a second portion of the mixture obtained in the solvent distillation is not recycled into step (A) but is discharged,
or
wherein the aromatic solvent of formula $C_6H_{6-X}Cl_X$ separated in the solvent distillation is obtained in a mixture with aromatic solvent of formula $C_6H_{6-Y}Cl_Y$, wherein a first portion of the mixture obtained in the solvent distillation is recycled into step (A) and a second portion of the mixture obtained in the solvent distillation is purified in a further distillation, wherein aromatic solvent of formula $C_6H_{6-X}Cl_X$ is separated from the second portion of the mixture obtained in the solvent distillation and subsequently recycled into step (A), wherein the portion of the second portion of the mixture obtained in the solvent distillation remaining after the separation of the aromatic solvent of formula $C_6H_{6-X}Cl_X$ from the second portion of the mixture obtained in the solvent distillation is discharged,
or
wherein the aromatic solvent of formula $C_6H_{6-X}Cl_X$ separated in the solvent distillation is obtained in a mixture with aromatic solvent of formula $C_6H_{6-Y}Cl_Y$, wherein the mixture obtained in the solvent distillation is purified in a further distillation, wherein aromatic solvent of formula $C_6H_{6-X}Cl_X$ is separated from the mixture obtained in the solvent distillation and subsequently recycled into step (A), wherein the portion of the mixture obtained in the solvent distillation remaining after the separation of the aromatic solvent of formula $C_6H_{6-X}Cl_X$ from the mixture obtained in the solvent distillation is discharged.

7. The process as claimed in claim 3, wherein the aromatic solvent of formula $C_6H_{6-X}Cl_X$ obtained at the top of the dividing wall column or at the top of the first distillation column is obtained in a mixture with aromatic solvent of formula $C_6H_{6-Y}Cl_Y$.

8. The process as claimed in claim 7,
wherein the mixture obtained at the top of the dividing wall column or at the top of the first distillation column is discharged,
or
wherein the mixture obtained at the top of the dividing wall column or at the top of the first distillation column is purified in a further distillation, wherein aromatic solvent of formula $C_6H_{6-X}Cl_X$ is separated from the mixture obtained at the top of the dividing wall column or at the top of the first distillation column and then recycled into step (A), wherein the portion of the mixture obtained at the top of the dividing wall column or at the top of the first distillation column remaining after the separation of the aromatic solvent of formula $C_6H_{6-X}Cl_X$ from the mixture obtained at the top of the dividing wall column or at the top of the first distillation column is discharged,
or
wherein a first portion of the mixture obtained at the top of the dividing wall column or at the top of the first distillation column is recycled into step (A) and a second portion of the mixture obtained at the top of the dividing wall column or at the top of the first distillation column is not recycled into step (A) but is discharged,
or
wherein a first portion of the mixture obtained at the top of the dividing wall column or at the top of the first distillation column is recycled into step (A) and a second portion of the mixture obtained at the top of the dividing wall column or at the top of the first distillation column is purified in a further distillation, wherein aromatic solvent of formula $C_6H_{6-X}Cl_X$ is separated from the second portion of the mixture obtained at the top of the dividing wall column or at the top of the first distillation column and then recycled into step (A), wherein the portion of the second portion of the mixture obtained at the top of the dividing wall column or at the top of the first distillation column remaining after the separation of the aromatic solvent of formula $C_6H_{6-X}Cl_X$ from the second portion of the mixture obtained at the top of the dividing wall column or at the top of the first distillation column is discharged.

9. The process as claimed in claim 7, comprising in step (B) a step of scrubbing the gaseous product mixture obtained in step (A) with aromatic solvent of formula $C_6H_{6-X}Cl_X$ for separating isocyanate, wherein
a first portion of the mixture obtained at the top of the dividing wall column or at the top of the first distillation column is recycled into the scrubbing step and a second portion of the mixture obtained at the top of the dividing wall column or at the top of the first distillation column is not recycled into the scrubbing step but is discharged,
or
wherein a first portion of the mixture obtained at the top of the dividing wall column or at the top of the first distillation column is recycled into the scrubbing step and a second portion of the mixture obtained at the top of the dividing wall column or at the top of the first distillation column is purified in a further distillation, wherein aromatic solvent of formula $C_6H_{6-X}Cl_X$ is separated from the second portion of the mixture obtained at the top of the dividing wall column or at the top of the first distillation column and then recycled into the scrubbing step or into step (A), wherein the portion of the second portion of the mixture obtained at the top of the dividing wall column or at the top of the first distillation column remaining after the separation of the aromatic solvent of formula $C_6H_{6-X}Cl_X$ from the second portion of the mixture obtained at the top of the dividing wall column or at the top of the first distillation column is discharged,
or
wherein the mixture obtained at the top of the dividing wall column or at the top of the first distillation column is purified in a further distillation, wherein aromatic solvent of formula $C_6H_{6-X}Cl_X$ is separated from the mixture obtained at the top of the dividing wall column or at the top of the first distillation column and then recycled into the scrubbing step or into step (A), wherein the portion of the mixture obtained at the top of the dividing wall column or at the top of the first distillation column remaining after the separation of the aromatic solvent of formula $C_6H_{6-X}Cl_X$ from the mixture obtained at the top of the dividing wall column or at the top of the first distillation column is discharged.

10. The process as claimed in claim 1, wherein pipe conduits which are used for connecting a tank container for receiving the liquid product mixture from step (A) with distillation means for performing step (B) and/or for connecting these distillation means to one another are fabricated from stainless steel of type 2.4610, 1.4529 or 1.4539.

11. The process as claimed in claim 1, wherein the final distillation is supplied with a product mixture comprising aromatic solvent of formula $C_6H_{6-X}Cl_X$ in a mass fraction based on its total mass of 8% to 49%.

12. The process as claimed in claim 1, wherein the discharged stream comprising aromatic solvent of formula $C_6H_{6-Y}Cl_Y$ contains said solvent in a mass fraction based on its total mass of 1.0% to 10%.

* * * * *